UNITED STATES PATENT OFFICE.

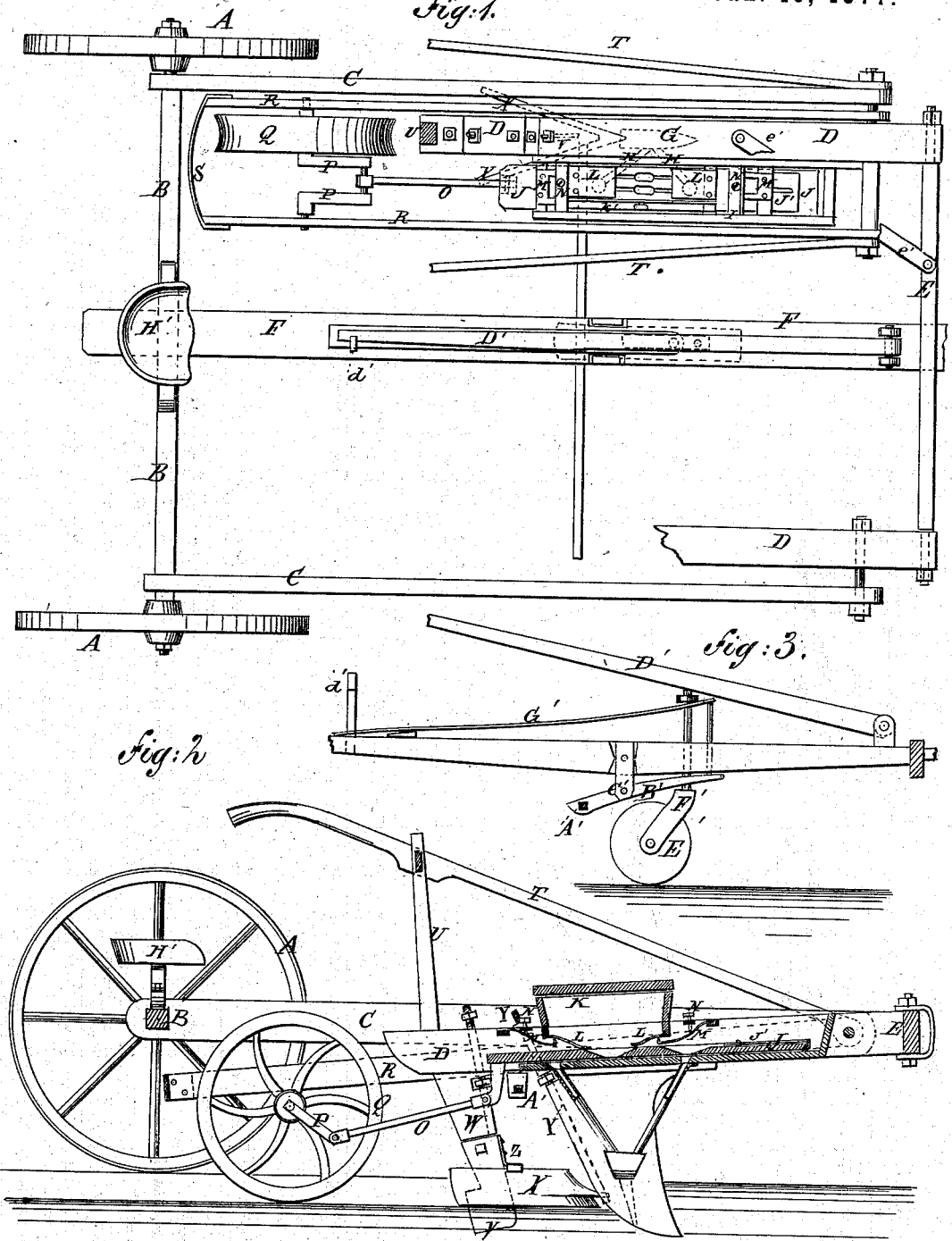

DANIEL J. DAVIS, OF RED BOILING SPRINGS, TENNESSEE.

IMPROVEMENT IN SEED-PLANTERS.

Specification forming part of Letters Patent No. 186,231, dated January 16, 1877; application filed September 2, 1876.

*To all whom it may concern:*

Be it known that I, DANIEL JONES DAVIS, of Red Boiling Springs, in the county of Macon and State of Tennessee, have invented a new and useful Improvement in Seed-Planter, of which the following is a specification:

Figure 1 is a top view of my improved seed-planter, parts being broken away. Fig. 2 is a vertical longitudinal section, taken through the line $x\ x$, Fig. 1. Fig. 3 is a side view of the central bar and its attachments.

Similar letters of reference indicate corresponding parts.

The object of this invention is to furnish an improved machine for planting corn and beans, and other seed, which shall be simple in construction, convenient in use, and effective and reliable in operation.

The invention consists in the construction and combination of parts, which will be hereinafter more fully described, and then pointed out in the claims.

A are the wheels, which revolve upon the journals of the axle B. Upon the end parts of the axle B are attached the rear ends of the side bars C, the forward ends of which are bolted to the outer sides of the forward ends of the plow-beams D. The forward ends of the beams D are bolted to the ends of the front bar E, to the center of which is secured the forward end of the central bar F. The connection between the beam D and the front bar E is strengthened by an inclined brace-bar, $e'$, attached to said parts D E. The rear end of the central bar F is secured to the center of the axle B. To the beams D are attached the plows G for opening furrows to receive the seed as it passes from the conductor-spouts H. The lower ends of the spouts or tubes H pass in through the sides of the plows G, so as to conduct the seed into the bottom of the furrows before they have been partially filled by the falling in of the soil. The upper part of the spout H is forked, and the ends of the branches are connected with the platform I, attached to the side of the plow-beam D, and along which the dropping-plate J slides. The dropping-plate J has two sets of holes formed in it, which alternately enter the hopper K, to receive the seed and carry it out at the opposite ends of the said hopper and allow it to pass through the spout H to the ground.

The dropping-plate J is concaved around its dropping-holes, as shown in Fig. 2, and is provided with a plate, J', that may be adjusted to cover one set of dropping-holes to drop the hills twice as far apart as when both sets of holes operate. L are inclined plates attached to the ends of the hopper K, the lower edges of which project down to or nearly to the dropping-plate J, to prevent too much seed from being carried out by said dropping-plate J. The exact amount of seed carried out by the dropping-plates J is regulated by the springs M, attached to a small cross-bar attached to the platform I at the ends of the hopper K, and which are adjusted by set-screws N passing through another cross-bar attached to said platform I. The hopper K is divided into two unequal compartments by a longitudinal partition, $k'$, so arranged as to have one hole of each set of dropping-holes in the smaller compartment, so that beans may be placed in the said smaller compartment and dropped at the same time with the corn.

To the rear end of the dropping-plate J, or to a projection formed upon or attached to said plate, is pivoted the forward end of the connecting-rod O, the rear end of which is pivoted to a crank formed upon the axle P of the covering-wheel Q. The face of the wheel Q is concaved, so that it will press the soil into a ridge over the seed.

The crank-axle P revolves in bearings in the rear parts of the bars R, and the crank-axles of the two covering-wheels may be connected by a coupling-rod bolted to their adjacent ends. The rear ends of the bars R are connected by a cross-bar, S, and their forward ends are pivoted to the long bolt that pivots the side bars C to the plow-beams D, and to which bolt are also attached the forward ends of the handles T, the rear ends of which are supported by a standard, U, attached to the rear end of the plow-beam D.

The furrow is filled to cover the seed by a plow-plate, V, attached to the rear end of the standard W attached to the rear end of the plow-beam D. X is a double-winged or V-shaped plow-plate, which is pivoted at its angle and fork to the lower ends of two long bolts, Y, that pass up through grooves in the adjacent edges of the plow G and the standard W through the plow-beam D, and are secured in place adjustably by nuts screwed upon their upper ends. The double-winged plow X is designed to push clods, lumps, &c., back from the furrow, and should be adjusted with its point a little higher than its wings to form a ridge. To the rear bolt Y is attached one arm of a three-armed spring, Z, the other arms of which rest upon the edges of the wings of the plow X to keep it level, and at the same time allow it to adjust itself to the surface of the ground.

Having thus described my invention, I claim as new and desire to secure by Letters Patent—

1. The combination of the opening-plow G, the covering-plow V W, the double-winged plow X, its long bolts Y and spring Z, and the covering-wheel Q and draw-bars R with each other, and with the plow-beam D and the carriage A B C E F for opening the furrow and covering the seed, substantially as herein shown and described.

2. The combination of the inclined plates L, the cut-off plates M, and the adjusting-screws N, with the hopper K, dropping-plate J, and the platform I for regulating the quantity of seed dropped at a time, substantially as herein shown and described.

DANIEL JONES DAVIS.

Witnesses:
THOMAS W. DAVIS,
ABNER JOINES.